INVENTORS
KAZUO NAKAJIMA
KIMITADA NAKAJIMA
HIDEO NAKAJIMA
BY

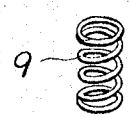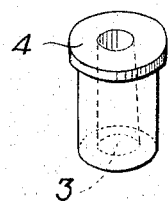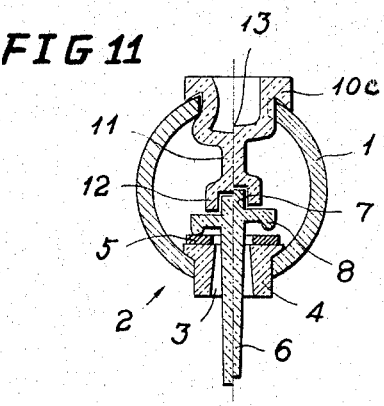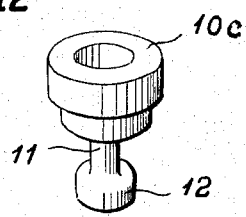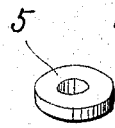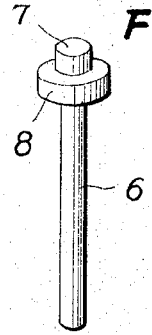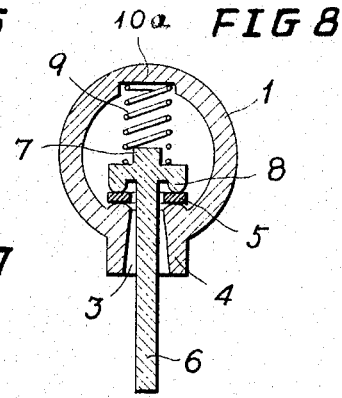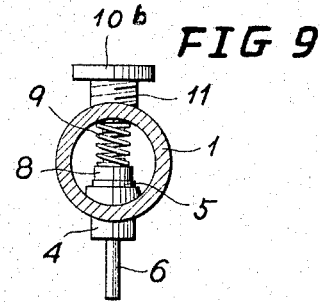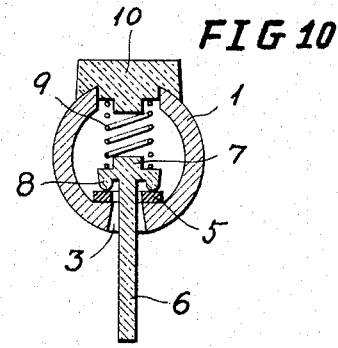

United States Patent Office 3,263,652
Patented August 2, 1966

3,263,652
POULTRY ACTUATED WATERING DEVICE
Kazuo Nakajima, 315 Onbegawa; Kimitada Nakajima, 315 Onbegawa; and Hideo Nakajima, 752 Fusetakada, all of Shinonoi, Japan
Filed Nov. 30, 1964, Ser. No. 414,781
6 Claims. (Cl. 119—72.5)

This invention relates to a poultry waterer, and more particularly, to a new water drinking faucet controlled by a chick.

In general, water is an important nutrient for poultry husbandry, but it is so easily and cheaply available that it is hardly talked of in an economical sense. As the chick by nature drinks water little by little at all times, a continuous supply of drinking water is required. The amount of drinking water depends upon the season of the year, and in general, the bird drinks water more in summer than in winer. The amount of water is usually about 150–300 grams a day per bird on the average.

Sometimes the water supply is limited in order to prevent the chicks from loose excrements, probably, on account of drinking water too much. In sultry summer weather, however, since the increased amount of drinking water is indispensable for the health of poultry, water limitation is not recommended. By the use of the chick controlled water drinking faucet in accordance with this invention, the restriction of water even in summer with a view to preventing loose excrements for poultry is not necessary, the reason therefor will be described hereinafter, which is one of the features of this invention.

Water is abundant at a location where a poultry farm is situated, so water is abundantly supplied in an amount much more than poultry really needs. However, water will be invaluable, since there exists a district or a season where water is scarce. Compared to a poultry watering fountain or trough of the prior art, the chick controlled water faucet of this invention will be able to utilize water to the fullest degree.

Various kinds of poultry watering apparatus have been heretofore proposed and sold in the market, but most of them are of the open type, that is, no cover or lid is provided on the watering devices, such as, fountains or troughs. If closed, the chick can't drink water. It is desirable that the fountain or trough be emptied, cleaned, disinfected and maintained in a highly sanitary condition at all times. Dust, germ, filth, excrement, feed and other foreign matter are accumulated in the drinking water in the open type fountain or trough, because there is provided neither a cover nor a lid. Therefore, laborers and labor costs necessary to clean and maintain the trough in a sanitary condition with a view to preventing epidemic can't be ignored in poultry raising.

In order to overcome the defects and disadvantages of the poultry watering means of the prior art, the inventors have contemplated the provision of a closed water drinking faucet adapted for poultry into which nothing foreign, such as, dust, filth or feed enters so that a very clean water can be supplied, whereby transmission of germs or bacilli to the poultry can be prevented.

It is, therefore, an object of this invention to provide a closed poultry waterer, in particular, a chick-controlled water drinking faucet which, compared to the conventional open-type watering device, can be installed at the same level as the beak of the chick so as to provide a waterer at a favorable position for poultry water drinking, and further, which is advantageous in that neither cleaning nor disinfection of the water supply conduit is required, because the clean water in the closed conduit is never contaminated with foreign matter.

It is another object of this invention to provide a chick-controlled watering faucet by which the check can drink water little by little so that it can satisfy its habit, and the splash of excess water when it drinks water in the open trough can be decreased to a minimum with the result that water can be saved.

It is a further object of this invention to provide a water faucet formed of a suitable plastic material adapted for mass production so that efficient and sanitary poultry watering equipment can be installed even on a large scale poultry farm at a low cost, and further, the number of laborers for cleaning open troughs and fountains is considerably reduced, whereby the danger of an epidemic among the birds caused by the foul water in a large scale poultry farm can be minimized, Numerous other objects and advantages of the invention will be apparent from the following description, which, taken in connection with the accompanying drawing, discloses several preferred embodiments thereof.

Referring to the drawing:

FIG. 4 is a perspective view of a spring of the faucet of this invention.

FIG. 5 is a perspective view of a packing of this faucet.

FIG. 6 is a perspective view of a hollow plug of this faucet.

FIG. 7 is a perspective view of a valve member of this faucet.

FIG. 8 is a sectional view of a modified embodiment of the faucet of this invention.

FIG. 9 is a side view of another modified embodiment of the facuet in which a section of the pipe is shown.

FIG. 10 is a sectional view of another modified embodiment of the faucet of this invention.

FIG. 11 is a sectional view of another modified embodiment of the faucet of this invention in which a coil spring is eliminated while a rubber head is inserted, and the left half of this view shows when the rubber head is being inserted, and the right half thereof after it is fixed in position.

FIG. 12 is a perspective view of the rubber head of the faucet of FIG. 12.

Figure 1:
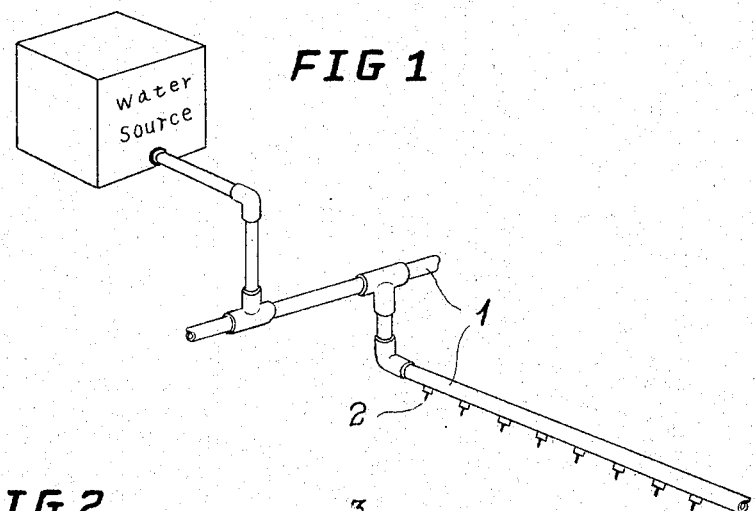
FIG. 1 is a perspective view of a poultry watering apparatus provided with a plurality of watering faucets made in accordance with the present invention.

As shown in FIG. 1, the water drinking faucet can be installed at the same height as the beak of a chick (not shown), since water drops along the valve member described later. The known open-type watering trough or fountain can't be installed as high as the chick, because it can't drink water located above itself. Water running through the closed pipe or conduit connected to a water source is maintained clean at all times so that it is free from bacilli.

Figure 2:
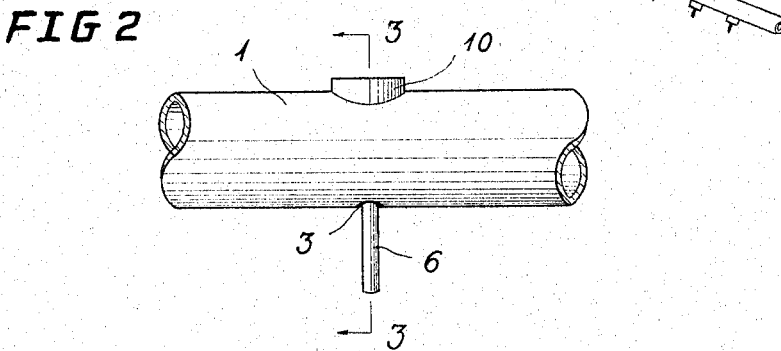
FIG. 2 is a side view of a single faucet of this invention provided in a water supply pipe or conduit.

FIG. 2 is a side view of the water faucet 2 provided within a pipe or conduit 1. As shown in FIG. 2, the water faucet 2 of this invention is inserted into the pipe 1 in a vertical direction to the axis of the pipe 1.

Figure 3:
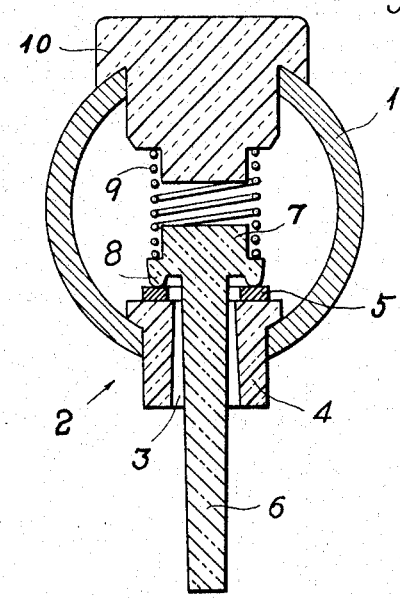
FIG. 3 is a vertical sectional view of the water faucet of this invention taken along the line 3—3 of FIG. 2.

FIG. 3 is a vertical sectional view of the water faucet in accordance with a preferred embodiment of this invention. This water faucet 2 comprises positioning means in the form of a spring support member 10, resilient means in the form of a coil spring 9, an annular packing 5, a hollow plug 4 and a valve having a depending valve rod 6. The spring support member 10 is formed of a solid cylindrical body adapted to be inserted into the water pipe 1 through the opening in an upper wall thereof when the pipe 1 is placed in a horizontal direction. The bottom of the support member 10 is formed with a recess to be engaged with the upper end of the coil spring 9. The lower end of the coil spring 9 is adapted to be engaged with the valve 7 having the rod 6. Thus, the coil spring 9 is held between the support member 10 and the valve member 7. As shown in FIG. 3, the valve 7 has a circular valve seat 8, the reverse side of which is provided with an annular projection urged towards the annular packing 5 made of rubber, synthetic resin, or leather by means of the force of the spring 9. The hollow plug 4 is a hollow cylindrical body with an upper flange as shown in FIG. 6. The plug 4 is also adapted to be inserted into the water pipe 1 through the opening in a lower wall thereof diametrically opposite to the opening in the upper wall in which the spring support member 10 is fixed. It is understood that both the spring support member 10 and the hollow plug 4 should be fitted into the water pipe 1 in a watertight manner.

As shown in the drawing, the plug 4 has the bore tapering or flaring downwardly and outwardly.

When assembled, a lower part of the rod 6 projects out of both the water pipe 1 and the plug 4. About 10 mm. of the forward portion of the rod 6 projects out of the plug 4, and the rod 6 has a diameter of about 2.5 mm. at its foremost end. The hollow plug 4 also projects out of the water pipe 1, and the projecting portion thereof is about 2 mm. at the shortest and about 5 mm. at the longest, but this is by way of explanation and is not to be considered a limitation of the invention.

The water pipe 1 is preferably made of a hard vinyl chloride resin material, and the outer diameter is 22 mm. and the inner diameter 18 mm.

In order to inhibit corrosion of a metallic spring which is always in contact with water, it is preferably made of a stainless steel of the 18 chrome–8 nickel type. The force of this spring is preferably less than 300 g. per unit, for a reason which will be described later. The packing 5 is preferably made of butyl rubber, and is 9 mm. in outer diameter and 4 mm. in inner diameter and 1 mm. in thickness.

The rod is preferably made of acetal resin dyed in red, the reason for which will be described later. The plug 4 and the support member 10 are preferably made of shock resistant styrol resin.

In reference to the materials described above, they are illustrative only.

The flared bore and function of the hollow plug 4 will be described. The inner diameter of the lower end of the bore of the plug is about 4.5 mm., and that of the upper end of the bore of the plug about 3.5 mm. As the diameter of the lower end of the rod is about 2.5 mm., there is space on the order of about 2 mm., which is obtained by subtracting 2.5 mm. from 4.5. When the end of the rod is subjected to an external force, such as, by the beak of a chick, it is caused to swing back and forth or left and right, because the rod is restrained merely by the coil spring and there is provided enough space for swinging it within the flared bore. Thus, when it swings, water-tightness maintained between the annular flange 8 and the annular packing 5 is broken so as to leak clean water running in the water pipe 1 along the rod to drop it into the beak of the chick. However, water-tightness is regained again upon cessation of the swing of the rod, because the annular flange 8 is urged towards the annular packing 5 by the force of the spring 9, therefore no water leaks from the water faucet of this invention.

In front of several chicks, when one shows that with the manual operation of the water faucet of this invention, water drops along the rod thereof, they peck at the red rod of the faucet and learn very soon how to drink water therefrom.

As described above, the tension of the spring 9 is preferably less than 300 g. per unit, so the rod of the faucet can be easily moved by the beak of the chick. However, a pullet under 40 days old is unable to peck at the faucet of this invention for water drinking, but it has been found that the chick more than 40 days old can drink water from this faucet.

An amount of drinking water at one time per chick from this faucet is only several grams. No matter how little the amount of water the chick may drink at one time, it has been found that, based on the facts of actual poultry raising, the amount of water necessary for the chick per day can be taken sufficiently by means of the faucet of this invention. Of course, the quantity of water taken by the chick depends upon the season of the year, summer or winter, and if the maximum is 300 g., it pecks at the faucet several or more times an hour to take the whole amount per day. At first sight, there are many who doubt whether the chick will be satisfied with such a few drops of water obtained from the faucet of this invention or not. However, when a large number of poultry are watered by this faucet, satisfactory results have been achieved from the use of the chick-controlled waterer.

The features and advantages of the water faucet of this invention are enumerated as follows: (1) loose excrements of chicks in summer because of drinking water too much can be reduced to a minimum; (2) clean water is supplied through the closed pipe or conduit so that fermentation and decomposition never take place in the water which inhibits epidemic among the birds; (3) labor for cleaning the trough is eliminated; and (4) every part except the spring is made of a synthetic resin material so that the faucet thus made is durable for an extended period of time, said spring being made of stainless steel to prevent corrosion.

FIGS. 4–7 show perspective views of the spring 9, the packing 5, the plug 4, and the rod 6, respectively. These figures show how to assemble the water faucet of this invention.

Various forms and modifications of the water faucet of this invention will be described hereinbelow.

FIG. 8 shows a modified form of the water faucet of this invention, in which the spring support member 10 shown in FIG. 3 is eliminated, instead the inner wall of the water pipe 1 is formed with positioning means in the form of a recess 10a with which the upper end of the spring 9 is engaged, and the plug 4 is somewhat modified at its upper end.

FIG. 9 shows another modified form of the water faucet in which the shank of the spring support member 10b is threaded at 11 as shown, and the threaded shank is adapted to engage with a female thread in the opening in the wall of the water pipe 1.

FIG. 10 shows another modified form of the water faucet in which the plug 4 of FIG. 3 is eliminated, and instead the inner wall of the water pipe 1 is made so flat that the annular packing 5 fits against it, and further, the inner wall is bored taperingly.

FIG. 11 shows another modified form of the water faucet in which the spring 9 of FIG. 3 is eliminated, and instead an elastic support member 13 having a cup-like head 10c, a shank 11, and a cap-like bottom is inserted into the upper opening of the wall of the water pipe 1. In this figure, the left half shows the position of the rubber member 13 as it is being inserted, and the right half after the member 13 has been fixed.

FIG. 12 is a perspective view of the elastic support member 13 of FIG. 11. This elastic member 13 is made of hard rubber.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

We claim:
1. A poultry controlled watering device, comprising a horizontal water conduit having a lower opening therein at a position along the length thereof, said lower opening being downwardly and outwardly flared, a valve, said valve having a depending valve rod extending through said opening, and an annular packing around said rod, a valve seat within the pipe adjacent said downwardly flared opening against which the packing bears, resilient means engaging said valve and urging it toward said opening, and positioning means in said conduit diametrically opposite said opening and engaging said resilient means and positioning said resilient means substantially along the diameter of said conduit.

2. A watering device as claimed in claim 1 in which includes a plug in said conduit at the position of said lower opening, said plug having a bore therein which constitutes said opening.

3. A watering device as claimed in claim 1 in which said conduit has further opening diametrically opposite said flared opening, and said positioning means comprises a spring support member extending through said further opening and having an extension thereon extending toward the center of the conduit, and said resilient means comprises a helical spring around said extension and bearing against said support member.

4. A watering device as claimed in claim 3 in which said spring support member is threaded into said further opening.

5. A watering device as claimed in claim 1 in which said conduit has a further opening diametrically opposite said flared opening, and said positioning means comprises a cup-shaped support member of resilient material resiliently engaged in said further opening and said resilient means is a projection of resilient material projecting from said cup-shaped member to said valve and integral with said cup-shaped member.

6. A watering device as claimed in claim 1 in which said conduit has a recess therein opening into the conduit at a point diametrically opposite said opening, said resilent means engaging in said recess, and said recess comprising said positioning means.

References Cited by the Examiner

UNITED STATES PATENTS

| | | | |
|---|---|---|---|
| 1,454,284 | 5/1923 | Holmes | 222—445 |
| 2,486,729 | 11/1949 | Beckley | 119—72.5 |
| 2,710,594 | 6/1955 | Thompson | 119—72.5 |
| 2,931,620 | 4/1960 | Burns | 251—318 |
| 3,058,718 | 10/1962 | Johnson | 251—321 |

FOREIGN PATENTS 26,012 12/1930 Australia.

SAMUEL KOREN, *Primary Examiner.*
ALDRICH F. MEDBERY, *Examiner.*